Aug. 17, 1965    J. P. HOUCK    3,201,656
SWITCHBOARD OF A MODULAR CONSTRUCTION
Filed April 29, 1960    9 Sheets-Sheet 1

WITNESSES:

INVENTOR
James P. Houck.
BY
ATTORNEY

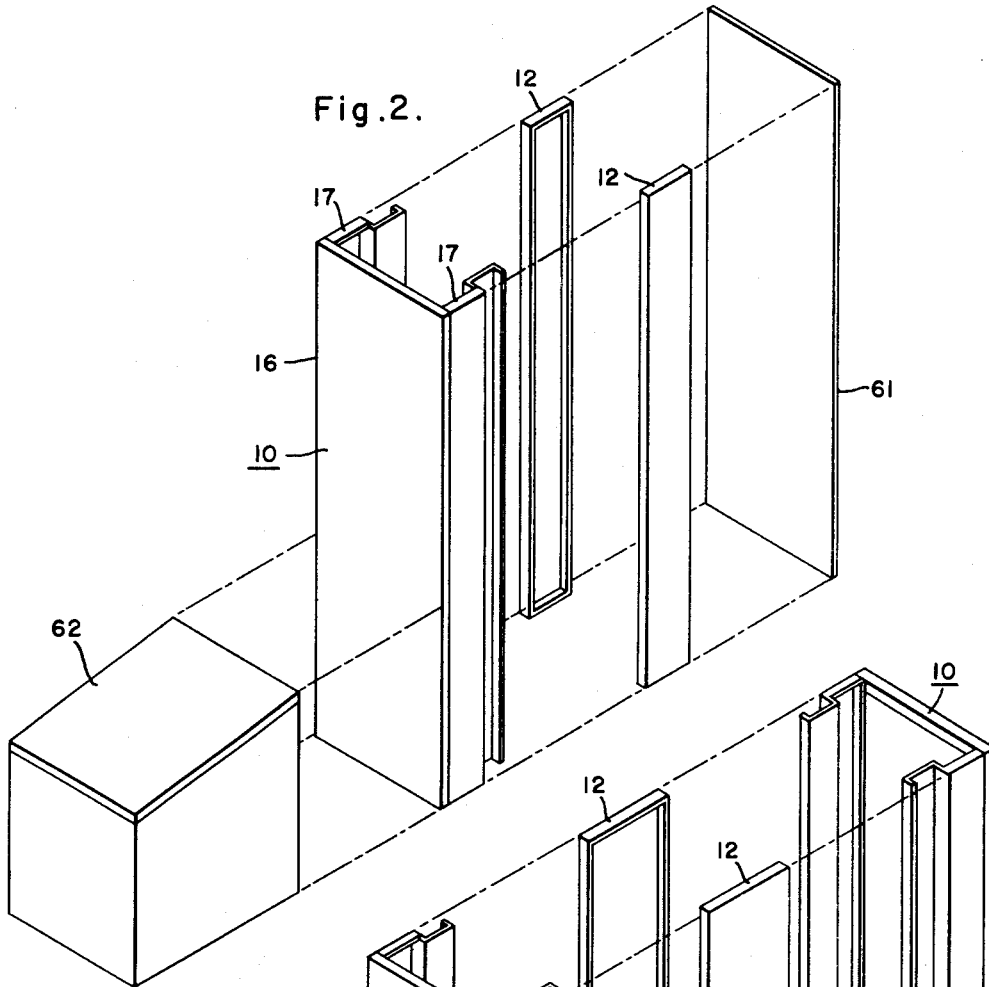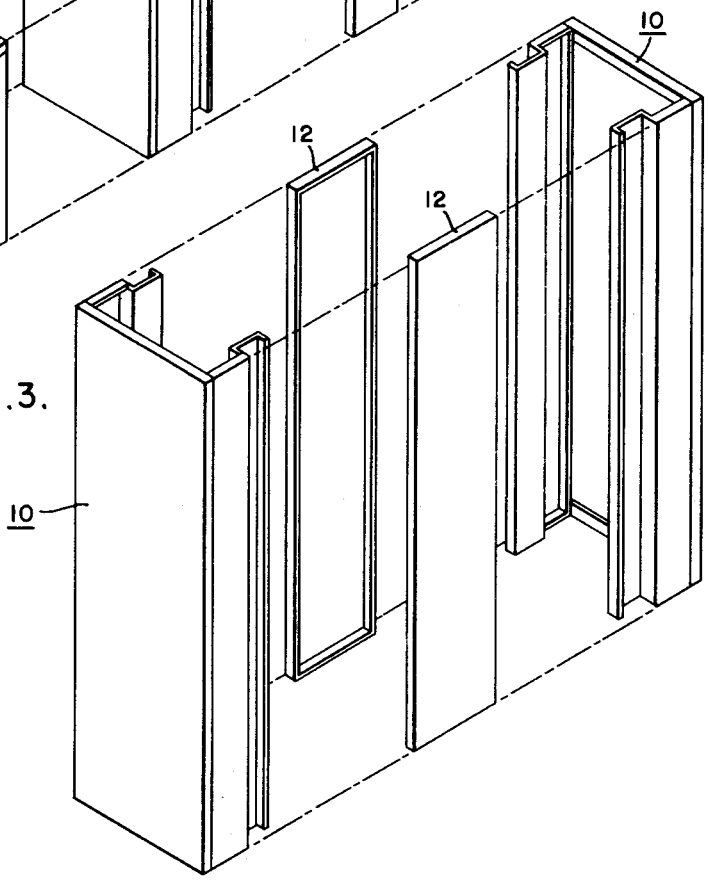

Aug. 17, 1965  J. P. HOUCK  3,201,656
SWITCHBOARD OF A MODULAR CONSTRUCTION
Filed April 29, 1960  9 Sheets-Sheet 3
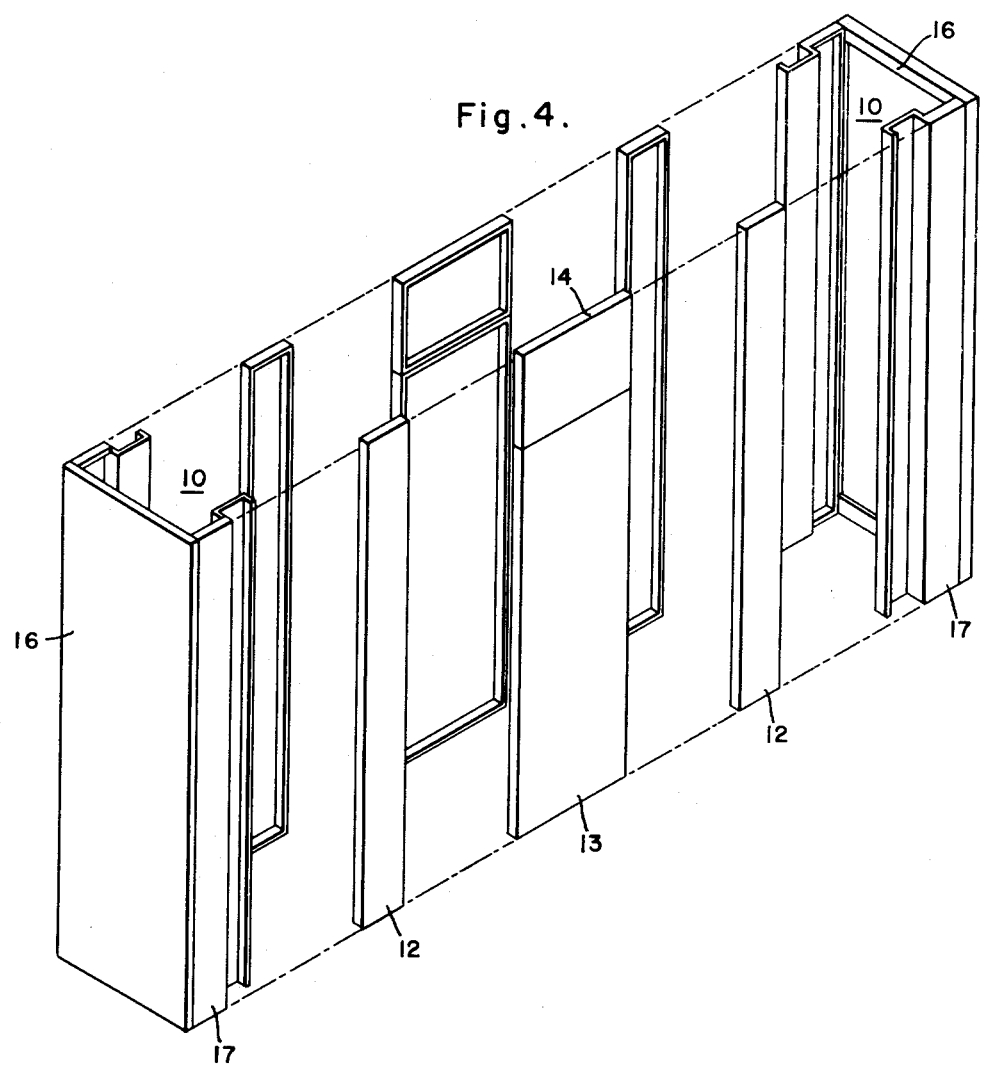

Aug. 17, 1965  J. P. HOUCK  3,201,656
SWITCHBOARD OF A MODULAR CONSTRUCTION
Filed April 29, 1960  9 Sheets-Sheet 7

Aug. 17, 1965    J. P. HOUCK    3,201,656
SWITCHBOARD OF A MODULAR CONSTRUCTION
Filed April 29, 1960    9 Sheets-Sheet 8
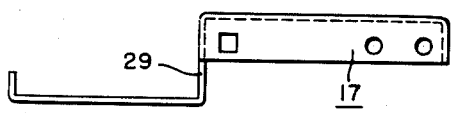
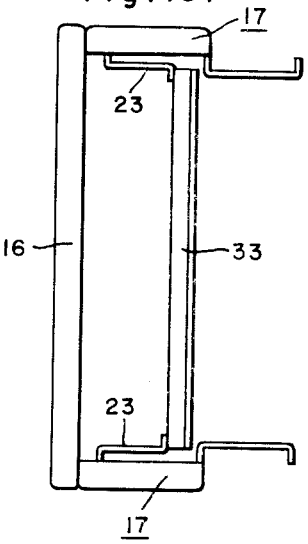
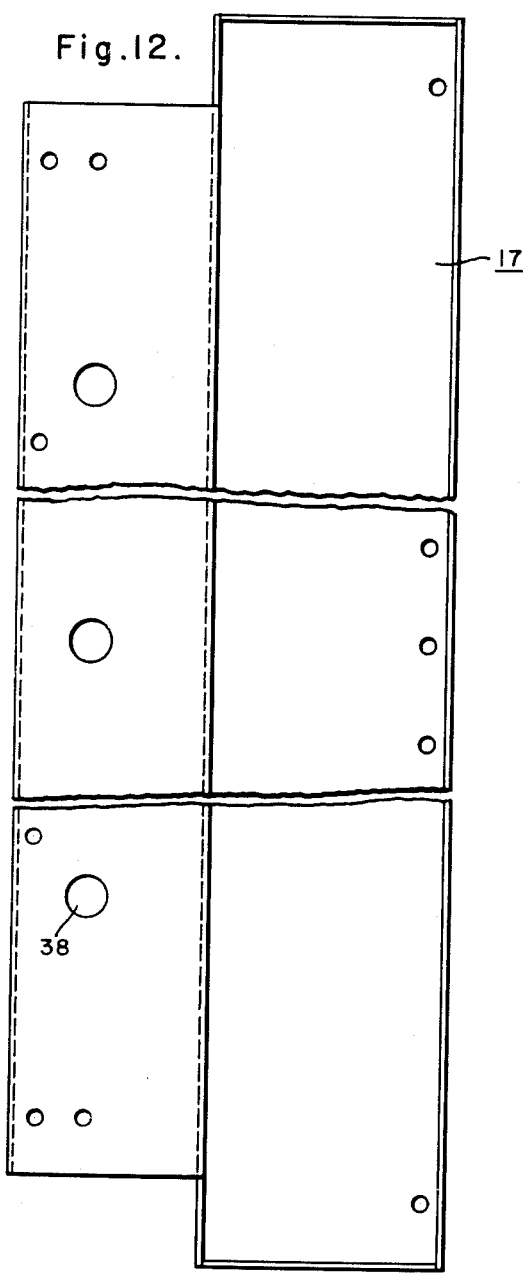

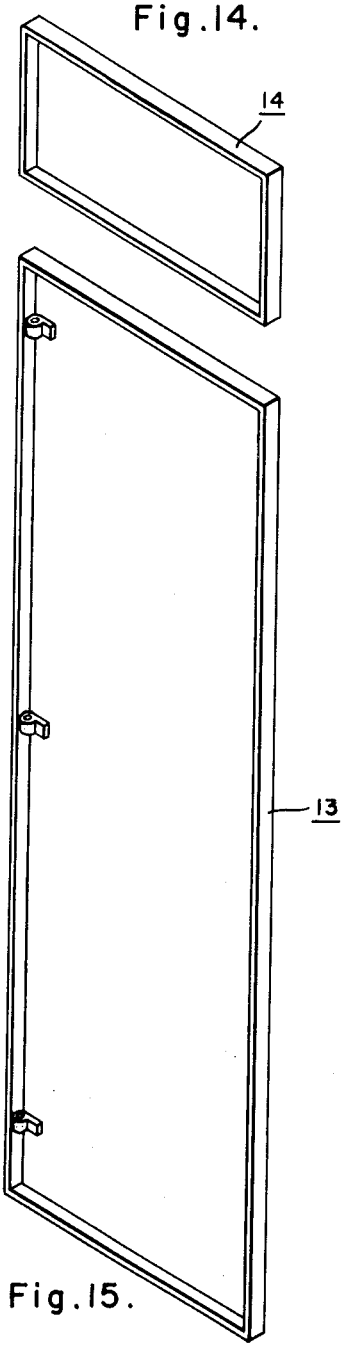
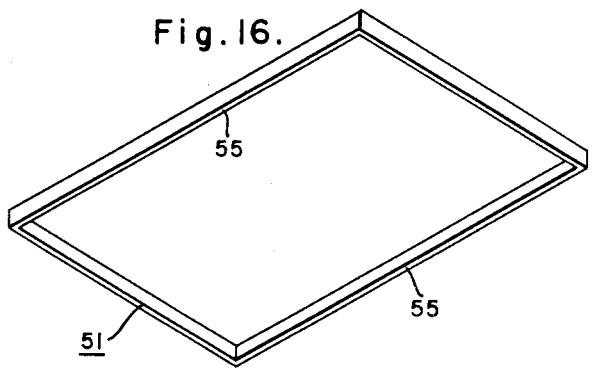
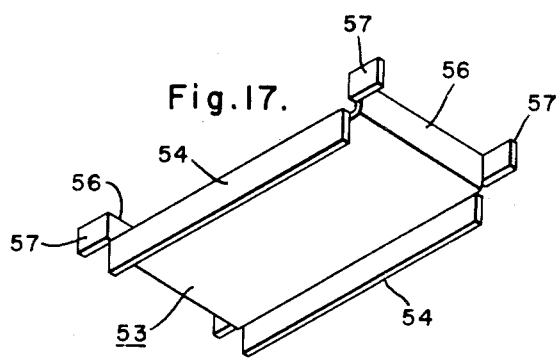

United States Patent Office 3,201,656
Patented Aug. 17, 1965

3,201,656
SWITCHBOARD OF A MODULAR CONSTRUCTION
James P. Houck, Pittsburgh, Pa., assignor to Westinghouse Electric Corporation, East Pittsburgh, Pa., a corporation of Pennsylvania
Filed Apr. 29, 1960, Ser. No. 25,675
8 Claims. (Cl. 317—117)

This invention relates, generally, to switchboards and, more particularly, to switchboards of a modular or unitized construction.

Heretofore, switchboards, control desks and benchboards of many sizes and shapes have been manufactured. Switchboard panels have varied from 76 to 100 inches in height and 12 to 50 inches in width. Custom built jobs have required the making of expensive drawings, many of which were used for only one job, thereby making such jobs expensive to design and manufacture.

An object of this invention is to provide a modular or unitized line of switchboards including vertical, enclosed, dual and duplex types, and also control desks including benchboards, dual benchboards and duplex benchboards.

Another object of the invention is to provide a basic panel assembly which can be utilized in each one of the foregoing types of switchboards.

A further object of the invention is to provide for bolting together the various components of a steel switchboard structure.

Still another object of the invention is to provide vertical wiring channels which are formed by integral parts of the basic panel assemblies in a switchboard structure.

A still further object of the invention is to provide for equipping and wiring each basic panel assembly before it is installed in a switchboard structure.

Still another object of the invention is to provide for mounting a plurality of terminal blocks on each basic panel assembly of a switchboard structure.

A further object of the invention is to provide a switchboard structure having the following advantages over prior structures:

(1) The structure has "building block" advantages and utilizes integral parts.

(2) The basic panel assembly of the structure provides a standard location and protection for purchaser's incoming conductors.

(3) The basic panel assembly is utilized in switchboards of all types and is completely interchangeable.

(4) The basic panel assembly is self-contained with terminal blocks for outgoing conductors.

(5) Panel positions can be changed without disturbing internal wiring.

(6) Blank panels reserved for future circuits can be replaced with factory-wired panels having panel conductors connected to self-contained terminal blocks.

(7) Because of bolted construction, vertical switchboard panels (basic panel assemblies with end trims) can easily be converted to an enclosed switchboard by adding enclosing members.

(8) Raceways or wiring channels for housing and protecting purchaser's incoming leads are suitable for either top or bottom cable entrances or both.

(9) Internal wiring is routed through readily accessible wiring channels.

(10) Wiring pans are provided at the top in the dual and duplex switchboards for accommodating-front-to-back panel and unit-to-unit wiring.

(11) Hinged rear auxiliary equipment panels may be provided as required. When opened, these panels permit ready access to the rear of the front panel components.

(12) Universal mounting brackets with slotted holes may also be utilized for the stationary mounting of auxiliary devices where such mounting does not interfere with access to the rear of the front panel components.

Other objects of the invention will be explained fully hereinafter or will be apparent to those skilled in the art.

In accordance with one embodiment of the invention a basic panel assembly, which is utilized in switchboards of various types, comprises a front panel, which may be fixed or hinged, and two vertical spaced side members which support major components, such as instruments, relays, switches, terminal blocks, wiring, etc., of a switchboard structure. The basic panel assembly is so constructed that it may be equipped and wired horizontally on a bench or a positioner of a trunnion type and then installed in its normal vertical position in the switchboard structure. Integral vertical wiring channels are provided at each side of the basic panel assembly. Slotted horizontal wiring channels with covers are supported by vertical angles secured to the side members. Hinged auxiliary panels may be mounted at the rear of the basic panel assembly. Auxiliary, or major components may be mounted on these hinged panels which may be swung out of the way to permit free access to the rear of the main panel.

For a better understanding of the nature and objects of the invention, reference may be had to the following detailed description, taken in conjunction with the accompanying drawings, in which:

FIG. 2 is an exploded isometric view of a benchboard constructed in accordance with the invention;

FIG. 3 is an exploded isometric view of a dual switchboard utilizing the invention;

FIG. 4 is an exploded isometric view of a duplex switchboard of the type shown in FIG. 1;

FIG. 11 is a view, in plan, of one of the vertical side members constituting part of the basic unit;

FIG. 12 is a view, in elevation, of the vertical side member;

FIG. 13 is a view, in plan, of a basic panel assembly without any apparatus on the panel;

FIG. 14 is an isometric view of a trim member utilized above a door in a duplex switchboard;

FIG. 15 is an isometric view of the door;

FIG. 16 is an isometric view of a top wiring pan utilized in a duplex switchboard; and FIG. 17 is an isometric view of a wiring trough utilized between two wiring pans.

Figure 1:
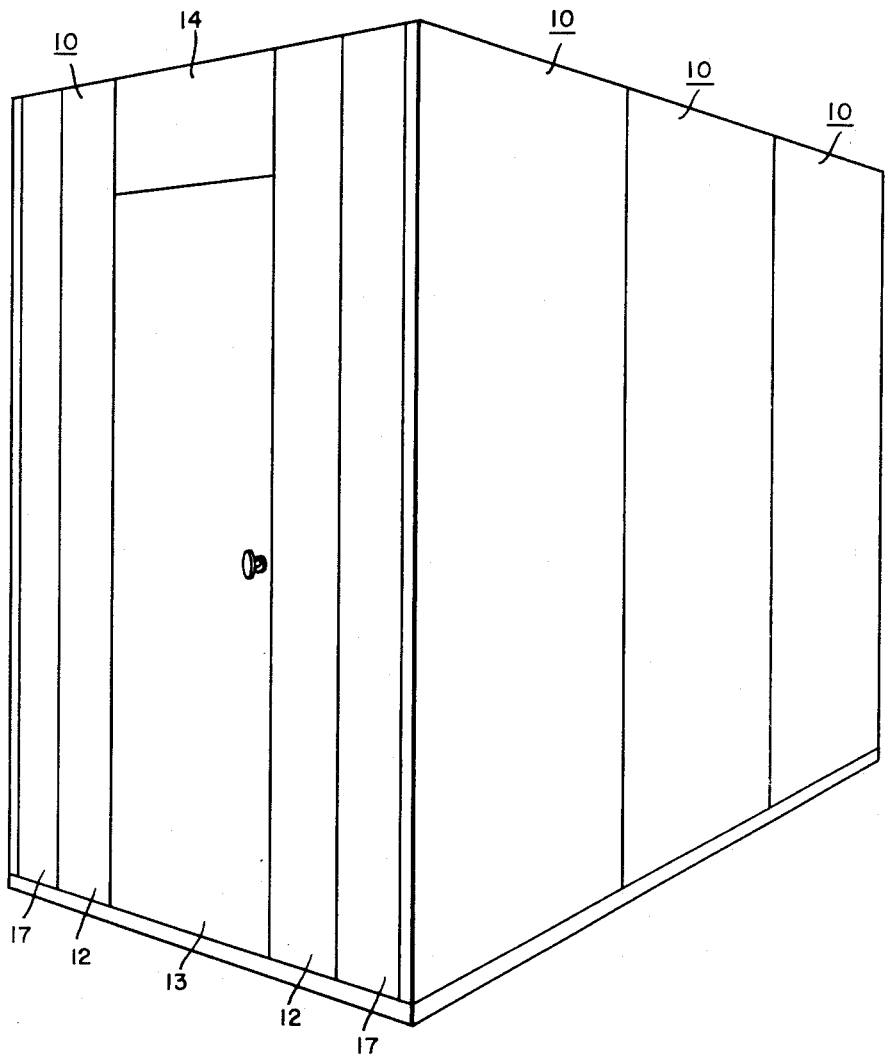
FIG. 1 is a view, in perspective, of a duplex switchboard embodying the principal features of the invention, the switchboard apparatus being omitted from the panels.
Figure 5:
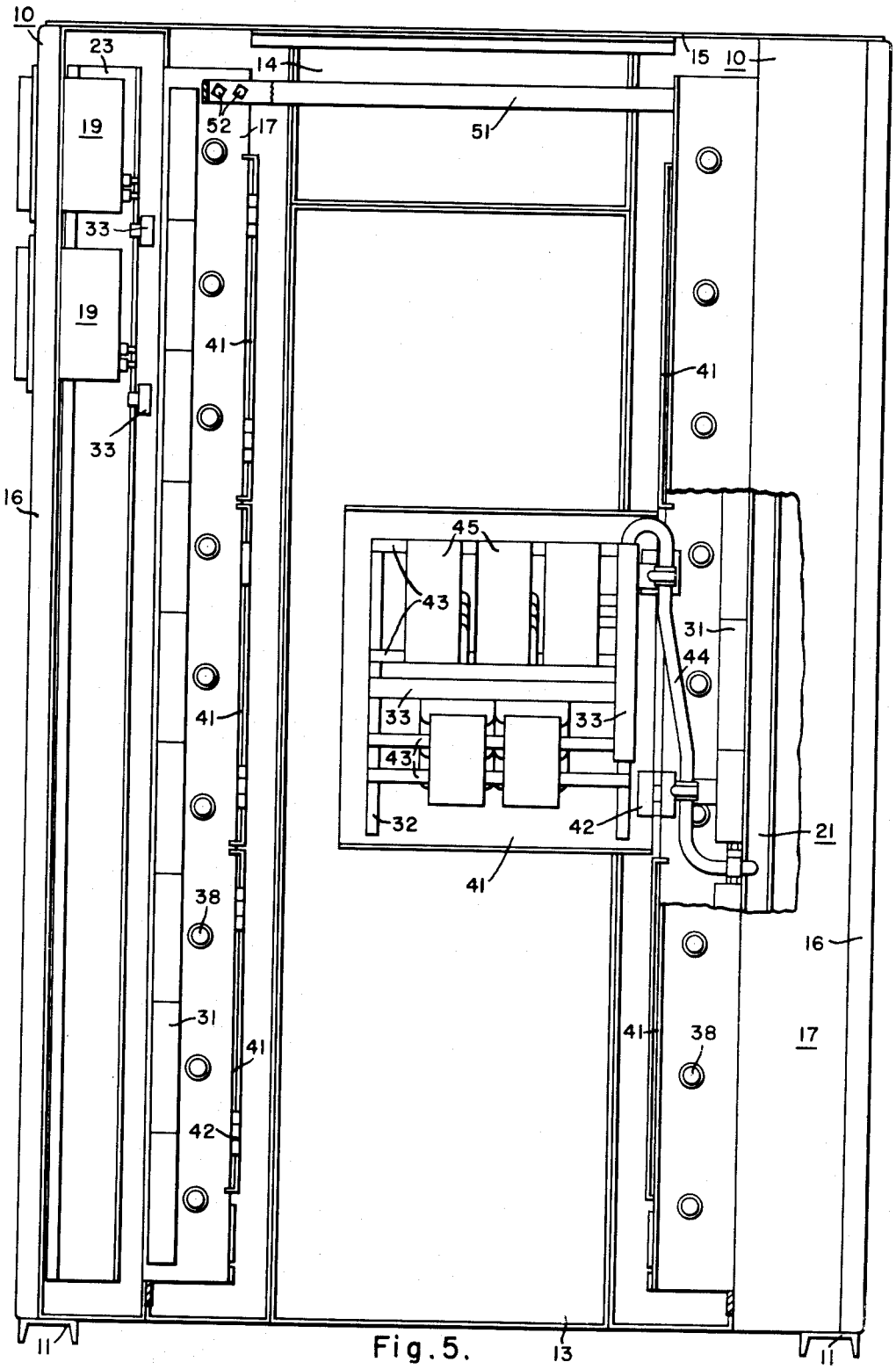
FIG. 5 is an enlarged view, partly in end elevation and partly in section, of the switchboard shown in FIG. 1.

Referring to the drawings, and particularly to FIG. 1, the structure shown therein comprises a three-section switchboard which is of the duplex type. As shown more clearly in FIGS. 4 and 7, each section comprises two basic panel assemblies 10 which are disposed back-to-back in spaced relation. As shown in FIG. 5, the basic panel assemblies are supported on channel shaped base members 11.

At each end of the switchboard structure the space between the basic panel assemblies 10 may be closed by two end trim members 12, a door 13 and a door trim member 14. It will be understood that the end trim members, the door and the door trim member are omitted between the sections of the switchboard structure. As shown in FIG. 5, the structure may be covered by a top trim member 15. It will be understood that the structure may include as many sections as desired.

Figure 6:
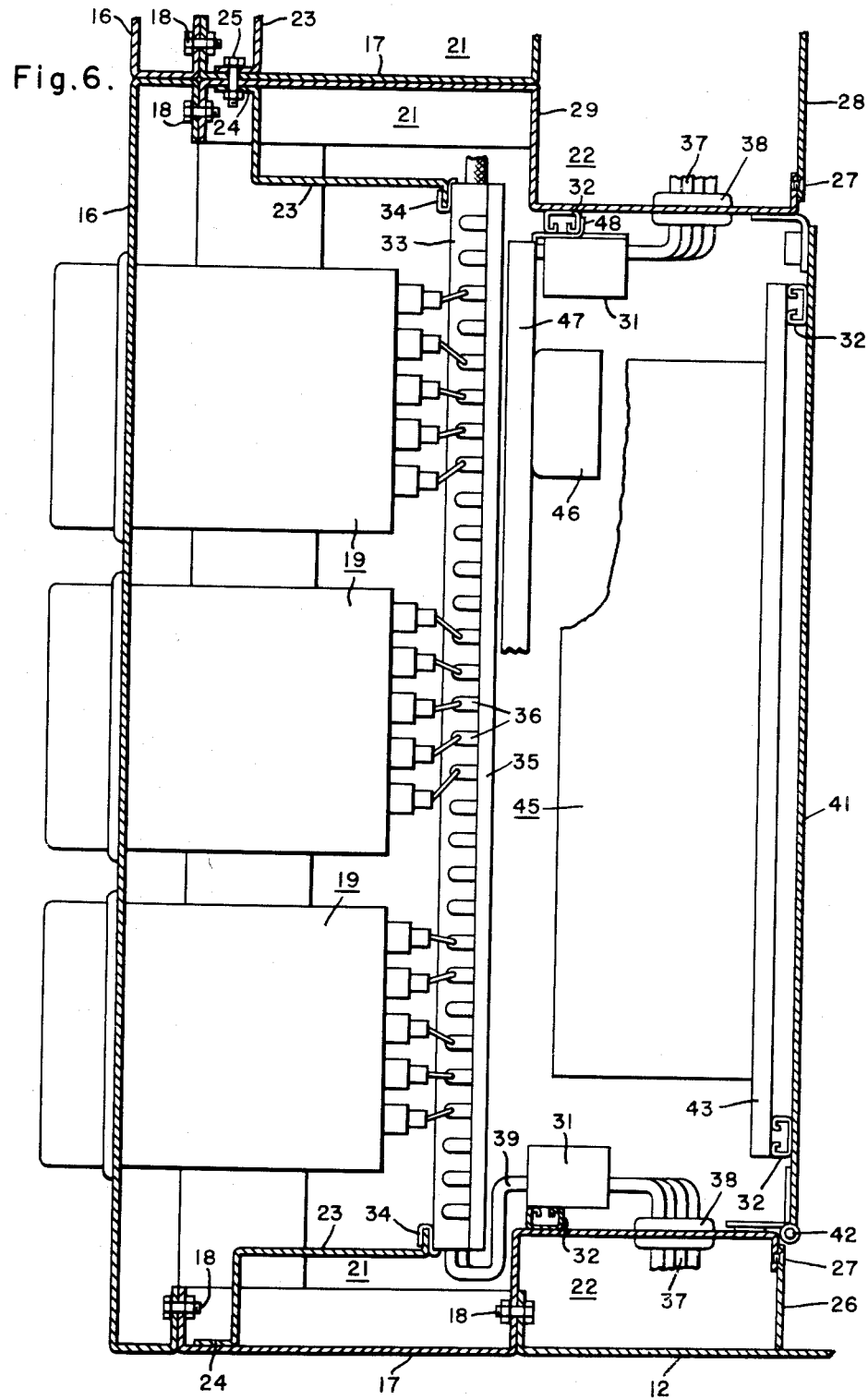
FIG. 6 is an enlarged view, partly in plan and partly in section, of a portion of the structure shown in FIG. 5.
Figure 9:
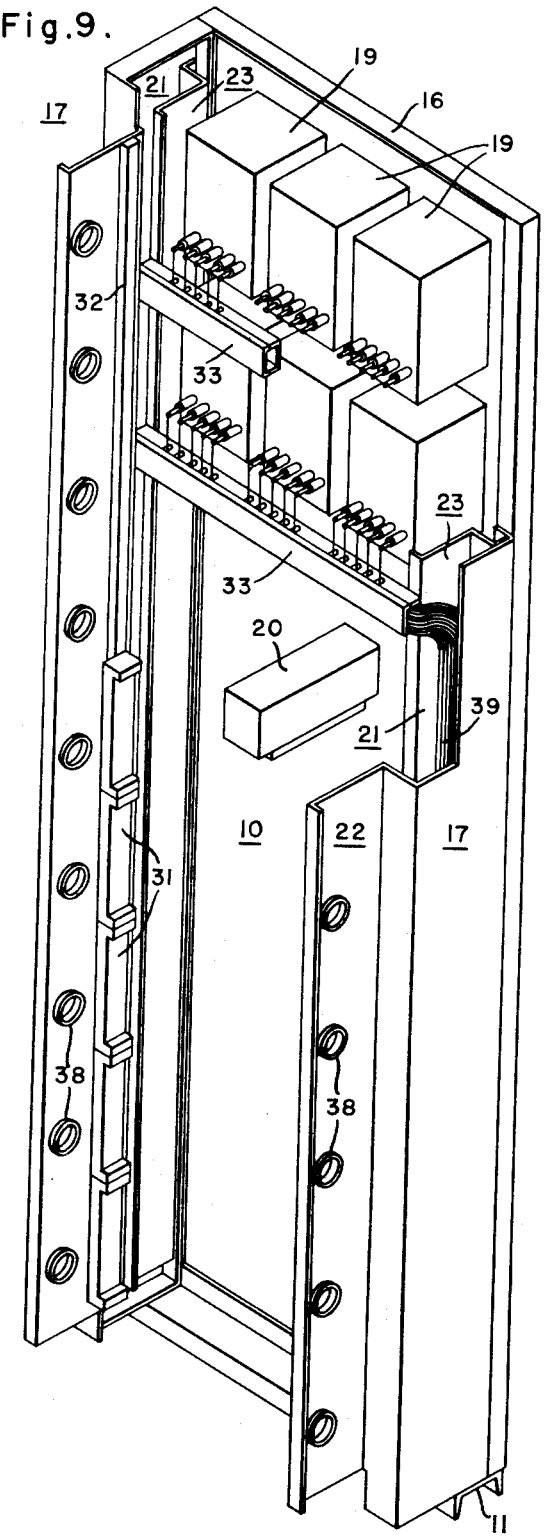
FIG. 9 is an isometric view, of a typical basic panel assembly and equipment utilized in switchboards of different types.
Figure 10:
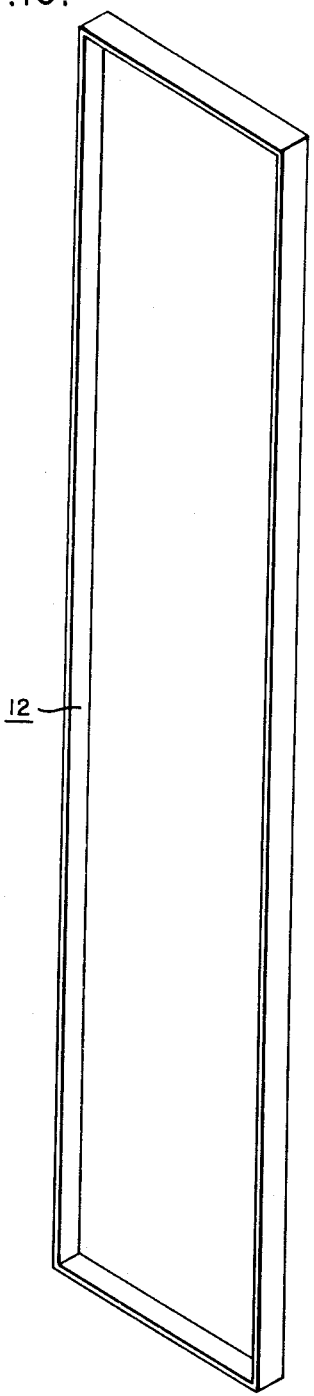
FIG. 10 is an isometric view of an end trim member utilized in conjunction with the basic panel assembly.

As shown most clearly in FIGS. 6, 9 and 13, each basic panel assembly 10 comprises a vertical panel 16 and two vertical side members 17 which are attached to in-turned flanges on the panel 16 by bolts 18. Electrical apparatus, such as instruments or relays 19 and control switches 20, may be mounted on the panel 16. It is the usual practice in the construction of duplex switchboards to mount apparatus of certain types on the front panels where it is most readily accessible and other apparatus on the rear panels of the duplex sections.

As shown most clearly in FIGS. 6, 11 and 12, each side member 17 is shaped to form a vertical wiring channel 21 which opens inwardly and a second vertical wiring channel 22 which opens outwardly. A generally L-shaped angle member 23 is secured to the side member 17 and constitutes part of the wiring channel 21. A flange 24 on one leg of the L-shaped member 23 may be welded to the side member 17. As shown in FIG. 6, adjoining sections of the switchboard structure may be tied together by bolts 25 which extend through the flanges 24 and the side members 17.

Figure 7:
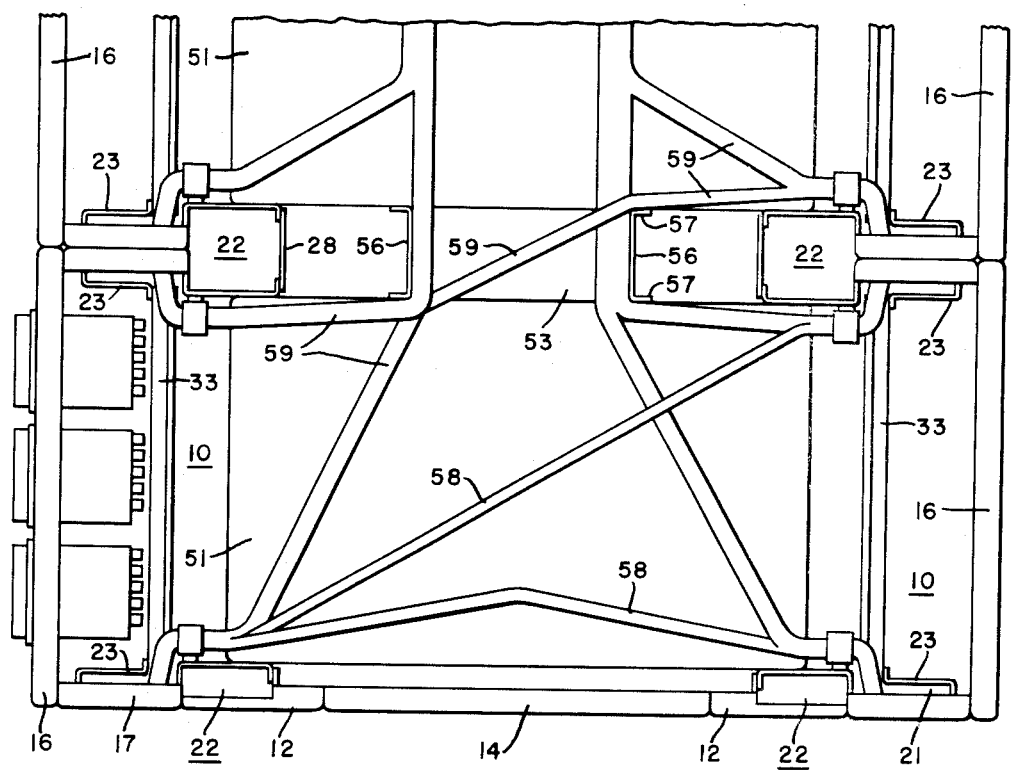
FIG. 7 is an enlarged view, in plan, of a portion of the switchboard shown in FIG. 1.

As shown most clearly in FIGS. 6 and 7, a cover plate 26 may be attached to a flange on the side member 17 by screws 27 to cooperate with the trim member 12 to enclose the wiring channel 22 at the end of the switchboard structure. A wider cover plate 28 may be attached to adjacent members 17 to cover the wiring channel 22 provided between adjoining sections of the switchboard structure. Thus, the width of the channel 22 between adjoining sections is approximately twice the width of the channel 22 at the end of the switchboard structure.

As shown in FIGS. 6 and 11, each side member 17 comprises two generally channel-shaped members having a common leg 29. As previously explained, the channel members open in opposite directions. Thus, when two side members of adjoining sections are disposed back-to-back, as shown in FIG. 6, a separate wiring channel 21 is provided for each section and a wiring channel 22 is provided which is common to the two adjoining sections of the switchboard structure. The channels 21 may be utilized for the wires which are connected to apparatus mounted on the switchboard panels and the channels 22 may be utilized to house the purchaser's incoming leads or conductors which may be brought in from either the top or the bottom or both.

As shown most clearly in FIGS. 6 and 9, terminal blocks 31 are mounted on a portion of each side member 17 which forms the vertical wiring channel 22. The terminal blocks 31 are supported by generally channel-shaped members 32 which are secured to the side member 17 by welding or by any other suitable means.

As also shown in FIGS. 6 and 9, horizontal wiring channels 33 are supported by the angle-shaped members 23. The channels 33 may be attached to the members 23 by clips 34 which engage inwardly extending flanges on the one leg of the members 23. The members 33 are preferably composed of plastic or non-conducting material and are readily attached to the angle members 23 by means of the clips 34. A removable snap-on cover 35 is provided for each channel member 33. The members 33 are provided with slots 36 through which wires extend to the terminals of the apparatus mounted on the panel. The open slots preclude the necessity of "threading" of wires when routing from one point to another.

As shown, conductors 37 extend through grommeted openings 38 in the wiring channels 22 to the terminal blocks 31. Similar conductors 39 extend from the terminal block 31 into the wiring channels 21. The conductors 39 extend along the channels 21 and enter the ends of the horizontal channels 33. As previously explained, the conductors 39 leave the horizontal channels 33 through the slots 36 and are connected to the proper terminals of the apparatus mounted on the panel 16. The conductors 37 may enter the channel 22 from the purchaser's cables at either the top or the bottom of the structure as previously explained.

As shown most clearly in FIGS. 5 and 6, swinging or hinged panels 41 may be attached to the side member 17 by means of hinges 42. The panels 41 may be utilized to support auxiliary or major switchboard apparatus 45. This apparatus 45 may be mounted on horizontal members 43 attached to generally channel-shaped members 32 which are secured to the hinged panel 41. As shown in FIG. 5, a bundle of conductors 44 may extend from the wiring channel 21 to the swinging panel 41. The wires enter channels 33 on the hinged panel and are then connected to the auxiliary or major equipment 45 mounted on the hinged panel in the manner hereinbefore explained. When the hinged panel 41 is swung to the position shown in FIG. 5, access may be had to the rear of the apparatus mounted on the panel 16.

If desired, additional auxiliary equipment 46 may be mounted on horizontally disposed support members 47 which are attached to the channel-shaped members 32 by brackets 48. It is preferable that the equipment 46 be so located that it will not interfere with access to the rear of the equipment mounted on the panel 16.

As shown most clearly in FIGS. 5 and 7, a horizontal wiring pan 51 extends across the space between the front and the rear basic panel assemblies near the top of the switchboard structure. The pan 51 may be attached to the side members 17 by bolts 52. The pan 51 is shown in detail in FIG. 16.

A wiring trough, shown in detail in FIG. 17, is disposed between the wiring pans 51 of adjacent sections of the switchboard structure. The trough 53 is provided with downwardly extending flanges 54 which may be attached to flanges 55 on the wiring pans 51. The trough 53 has upwardly extending flanges 56 having angularly bent ends 57 for retaining wire conductors in position. As shown in FIG. 7, conductors 58 may extend from the panels 16 at the front of the structure over the pans 51 to the panels 16 at the rear of the structure. Likewise, conductors 59 may extend from one section of the structure over the trough 53 to an adjacent section of the structure.

Thus, it will be seen that each basic panel assembly is self-contained with terminal blocks for making the outgoing connections from the assembly. The basic panel assembly is so constructed that it may be equipped and wired horizontally on a trunnion-type positioner or bench and later installed in the normal vertical position in the switchboard structure. Furthermore, blank panels reserved for future circuits may be replaced with panels which are completely wired at the factory and having terminal blocks thereon for making connections to the panel when it is installed in the switchboard structure. Field changes may readily be made without disturbing the appearance or continuity of internal wiring which is routed through readily accessible wiring channels. Only the interconnections between panels and units on the same switchboard need be connected after installation of the basic panel assembly in the switchboard structure.

The basic panel assembly is so constructed that it may be utilized in switchboards of all of the various types. Thus, as shown in FIG. 2, a single basic panel assembly 10 plus two side members 12 and a rear cover plate 61 constitute a single section vertical enclosed switchboard. A control desk or console 62 may be added to the structure to constitute a benchboard.

Figure 8:
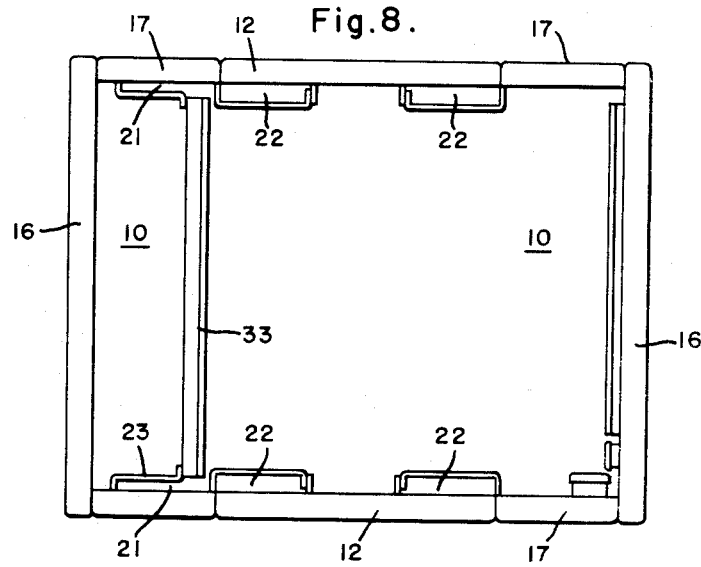
FIG. 8 is a view, in plan, of a dual switchboard.

As shown in FIGS. 3 and 8, two basic panel assemblies 10 disposed back-to-back in spaced relation plus two side trim members 12 constitute a dual switchboard. It is the usual practice to hinge one of the panels 16 in a dual switchboard, thereby providing access to the interior of the switchboard structure. The manner of hinging switchboard panels is well known in the art and will not be described in detail. The L-shaped members 23 are omitted from the side members 17 adjoining the hinged panel 16. Channels of plastic or other non-conducting material are used on the hinged panel in both vertical and horizontal arrangements for routing of wires.

As shown in FIG. 4, two basic panel assemblies 10 disposed back-to-back in spaced relation with side trim members 12 and doors 13 in the space between the basic units constitute a duplex switchboard. The detailed structure of a duplex switchboard has been described hereinbefore. As explained hereinbefore, as many sections as required of each type of switchboard may be erected side-by-side to provide a structure of the desired size. It will be understood that a control desk 62 may be utilized with a dual switchboard to provide a dual benchboard. Also a control desk may be utilized with a duplex switchboard to provide a duplex benchboard. Therefore, the basic panel assembly may be utilized in switchboards of all types and is completely interchangeable in all of the various types.

From the foregoing description it is apparent that the present invention provides a switchboard structure having numerous advantages over prior switchboards. From the manufacturer's viewpoint, the switchboard may be constructed without requiring a large number of specialized drawings for each job built. The components and equipment for each section may be assembled and wired prior to the installation of the section in the switchboard structure. Thus, a switchboard of the present type may be built more economically and in less time than prior switchboards. When the switchboard is installed in service the incoming connections to the switchboard may be readily made to the terminal blocks provided at the factory. Furthermore, any field changes required may be readily made. Since the wiring is concealed in the wiring channels, a neat appearing job is obtained without the time and expense of assembling and tying the wires in wire bundles.

Since numerous changes may be made in the above described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. A basic panel assembly for use in any one of a plurality of different types of switchboard structures, said assembly comprising a panel having electrical apparatus thereon with terminals at the rear of the panel and two vertical side members attached to the panel, each side member having one channel-shaped portion opening inwardly toward said terminals to form a first wiring channel and another channel-shaped portion connected to said one channel-shaped portion and opening outwardly away from said terminals to form a second wiring channel, terminal blocks mounted on the second wiring channel, wires extending from said second wiring channel to said terminal blocks and additional wires extending from said terminal blocks into said first wiring channel and thence to said apparatus terminals, said additional wires being preassembled on said panel assembly to electrically connect said terminal blocks and said apparatus terminals.

2. In a switchboard structure, a basic panel assembly comprising a panel having electrical apparatus thereon with terminals at the rear of the panel and two vertical side members attached to the panel, each side member having a channel-shaped portion opening inwardly toward said terminals to form a first unobstructed wiring channel and another channel-shaped portion opening outwardly away from said terminals to form a second unobstructed wiring channel, said channel-shaped portions having one integrally formed leg common to both portions, terminal blocks mounted on the second wiring channel, and wires extending from the terminal blocks into the first wiring channel to electrically connect said terminal blocks and said apparatus terminals.

3. In a switchboard structure, a basic panel assembly comprising a panel having electrical apparatus thereon with terminals at the rear of the panel and two vertical side members attached to the panel, each side member having a channel-shaped portion opening inwardly toward said terminals to form a first unobstructed wiring channel and another channel-shaped portion opening outwardly away from said terminals to form a second unobstructed wiring channel, said channel-shaped portions having one integrally formed leg common to both portions, a generally L-shaped member secured to one of said channel-shaped portions to constitute part of the first wiring channel, terminal blocks mounted on the second wiring channel, and wires extending from the terminal blocks into the first wiring channel to electrically connect said terminal blocks and said apparatus terminals.

4. In a switchboard structure, in combination, two basic panel assemblies disposed back-to-back in spaced relation, each basic panel assembly comprising a panel having electrical apparatus thereon with terminals at the rear of the panel and two vertical side members attached to the panel, each side member forming two unobstructed vertical wiring channels one of which opens inwardly toward said terminals and the other of which opens outwardly away from said terminals, an end trim member covering the outwardly opening wiring channel, terminal blocks supported by the side members for receiving wires from the outwardly opening channels, and wires extending from the terminal blocks into the inwardly opening channels and thence to said apparatus terminals, said wires being preassembled on each panel assembly to electrically connect said terminal blocks and said apparatus terminals.

5. In a multi-section switchboard structure, in combination, at least two basic panel assemblies disposed side-by-side, each basic panel assembly comprising a panel having electrical apparatus thereon with terminals at the rear of the panel and two vertical side members attached to the panel, each side member forming two vertical wiring channels one of which opens inwardly toward said terminals and the other of which opens away from said terminals outwardly toward an adjacent assembly, the outwardly opening channels of two adjacent assemblies forming a wiring channel common to both of said assemblies when said panel assemblies are disposed side by side, and end trim members covering the outwardly opening channels at the ends of the switchboard structure.

6. In a multi-section switchboard structure, in combination, at least two basic panel assemblies disposed side-by-side, each basic panel assembly comprising a panel having electrical apparatus thereon with terminals at the rear of the panel and two vertical side members attached to the panel, each side member forming two vertical wiring channels one of which opens inwardly toward said terminals and the other of which opens away from said terminals outwardly toward an adjacent assembly, the outwardly opening channels of two adjacent assemblies forming a wiring channel common to both of said assemblies when said panel assemblies are disposed side-by-side, end trim members covering the outwardly opening channels at the ends of the switchboard structure, terminal blocks mounted on the outwardly opening channels, and wires extending from said terminal blocks into said inwardly opening channels and thence to said apparatus terminals, said wires being preassembled on each panel assembly to electrically connect said terminal blocks and said apparatus terminals.

7. In a duplex switchboard, in combination, two basic panel assemblies disposed back-to-back in spaced relation, each basic panel assembly comprising a panel having electrical apparatus thereon with terminals at the rear of the panel and two vertical side members attached to the panel, each side member forming two vertical wiring channels one of which opens inwardly toward said terminals and the other of which opens outwardly away from said terminals, a horizontal wiring pan attached to the side members of oppositely disposed assemblies, terminal blocks mounted on the outwardly opening channels, wires extending from said terminal blocks into said inwardly opening channels and thence to said apparatus terminals, said wires being preassembled on each panel assembly to electrically connect said terminal blocks and said apparatus terminals and additional wires extending from said inwardly opening channels on one assembly across said wiring pan into inwardly opening channels on an opposite assembly.

8. In a duplex switchboard, in combination, two basic panel assemblies disposed back-to-back in spaced relation, each basic panel assembly comprising a panel having electrical apparatus thereon with terminals at the rear of the panel and two vertical side members attached to the panel, each side member formnig two vertical wiring channels one of which opens inwardly toward said terminals and the other of which opens outwardly away from said terminals, a horizontal wiring pan attached to the side members of oppositely disposed assemblies, terminal blocks mounted on the outwardly opening channels, wires extending from said terminal blocks into said inwardly opening channels and thence to said apparatus terminals said wires being preassembled on each panel assembly to electrically connect said terminal blocks and said apparatus terminals, additional wires extending from inwardly opening channels on one assembly across said wiring pan into inwardly opening channels on an opposite assembly, an auxiliary panel hinged on one of said side members, and wires extending between said auxiliary panel and an inwardly opening channel.

References Cited by the Examiner
UNITED STATES PATENTS

| | | | |
|---|---|---|---|
| 2,140,376 | 12/38 | Anderson | 317—122 |
| 2,191,637 | 2/40 | Wier | 317—120 |
| 2,542,853 | 2/51 | Wills | 317—120 |
| 2,648,032 | 8/53 | Mekelburg | 317—117 |
| 2,756,369 | 7/56 | Gorrie | 317—117 |

LARAMIE E. ASKIN, *Primary Examiner.*
SAMUEL BERSTEIN, JOHN F. BURNS, *Examiners.*